(12) United States Patent
Dickenscheid et al.

(10) Patent No.: US 7,178,511 B2
(45) Date of Patent: Feb. 20, 2007

(54) APPARATUS FOR CONTROLLING A PRESSURE IN A FUEL INFLOW LINE

(75) Inventors: Lothar Dickenscheid, Ockenheim (DE); Bernd Herzog, Huenfelden (DE)

(73) Assignee: Siemens Aktiengesellschaft, Munich (DE)

( * ) Notice: Subject to any disclaimer, the term of this patent is extended or adjusted under 35 U.S.C. 154(b) by 227 days.

(21) Appl. No.: 11/040,677

(22) Filed: Jan. 20, 2005

(65) Prior Publication Data
US 2005/0155586 A1 Jul. 21, 2005

(30) Foreign Application Priority Data
Jan. 21, 2004 (DE) .................... 10 2004 003 113

(51) Int. Cl.
*F02M 37/00* (2006.01)
(52) U.S. Cl. ...................... 123/514; 123/510
(58) Field of Classification Search ............... 123/510, 123/511, 514, 457; 137/543.19, 115.26, 137/115.15, 119.01
See application file for complete search history.

(56) References Cited

U.S. PATENT DOCUMENTS

| | | | | |
|---|---|---|---|---|
| 3,604,446 A | * | 9/1971 | Brooks ................... | 137/115.03 |
| 4,791,950 A | * | 12/1988 | Pedersen ................ | 137/115.26 |
| 5,050,636 A | * | 9/1991 | Sagawa et al. ........... | 137/494 |
| 5,429,096 A | * | 7/1995 | Fukasawa et al. .......... | 123/514 |
| 5,713,389 A | * | 2/1998 | Wilson et al. ........... | 137/515.7 |
| 5,715,798 A | * | 2/1998 | Bacon et al. ............. | 123/514 |
| 5,971,718 A | | 10/1999 | Krueger et al. | |
| 6,099,263 A | * | 8/2000 | Bodzak et al. ............ | 417/295 |
| 6,170,466 B1 | * | 1/2001 | Klinger et al. ............ | 123/458 |
| 6,209,527 B1 | | 4/2001 | Bueser et al. | |
| 6,279,545 B1 | * | 8/2001 | Frank et al. .............. | 123/514 |
| 7,096,857 B2 | * | 8/2006 | Hlousek .................. | 123/506 |

FOREIGN PATENT DOCUMENTS

| | | |
|---|---|---|
| DE | 195 27 134 A1 | 3/1996 |
| DE | 196 18 707 A1 | 11/1997 |
| DE | 101 06 095 A1 | 8/2002 |
| DE | 199 36 287 C2 | 4/2003 |
| EP | 0 698 733 A1 | 2/1996 |
| JP | 08100727 | 4/1996 |
| JP | 11280930 | 10/1999 |

* cited by examiner

*Primary Examiner*—Thomas Moulis
(74) *Attorney, Agent, or Firm*—Richard A. Speer; Mayer, Brown, Rowe & Maw LLP

(57) ABSTRACT

In an apparatus (12) for controlling a pressure in a fuel inflow line of a motor vehicle, a shutoff valve (20) and a pressure limiting valve (21) are arranged in a connection (19). The connection (19) is arranged between an inflow junction (16) which leads to the inflow line and an outflow junction (17) which is led into a fuel container. The pressure limiting valve (21) opens above a first pressure and throttles the flow of the fuel through the connection (19). The shutoff valve (20) closes above a second pressure, the second pressure being higher than the first pressure. This ensures that, when a fuel delivery unit is at a standstill, the pressure in the inflow line does not exceed the first pressure and that, during operation of the delivery unit, the pressure in the inflow line can rise above the second pressure and an internal combustion engine of the motor vehicle is supplied sufficiently with fuel.

9 Claims, 2 Drawing Sheets

APPARATUS FOR CONTROLLING A PRESSURE IN A FUEL INFLOW LINE

BACKGROUND OF THE INVENTION

The invention relates to an apparatus for controlling a pressure in a fuel inflow line of a motor vehicle, having an inflow junction which is provided for connecting to the inflow line and having an outflow junction which is provided for returning fuel into a fuel container, and having a valve which is arranged in a connection between the inflow junction and the outflow junction.

In order to limit a pressure provided in an inflow line, pressure limiting valves have been disclosed which open above a predefined pressure and lead excess fuel back into the fuel container. The maximum pressure which is fed to the internal combustion engine is therefore limited.

In modern motor vehicles, however, there is the problem that fuel can emerge from an injection nozzle of the internal combustion engine after the internal combustion engine has been switched off. This fuel cannot flow back into the fuel container on account of a nonreturn valve which is arranged in the fuel container. In particular when the internal combustion engine is switched off in cold weather, the pressure in the inflow line rises as the temperature rises, and fuel emerges from the injection nozzle. Here, the pressure in the inflow line can rise from 0 bar to as much as 3 bar. In particular in future motor vehicles without pollutant emissions (what are known as zero emission vehicles), this can no longer be accepted.

The invention is based on the problem of designing an apparatus of the type mentioned in the introduction in such a way that it largely prevents fuel from emerging from the switched off internal combustion engine.

BRIEF DESCRIPTION OF THE INVENTION

According to the invention, this problem is solved by a pressure limiting valve which closes the connection between the inflow junction and the outflow junction below a predefined first pressure and throttles flow through the connection above the first pressure, and a shutoff valve which closes the connection between the inflow junction and the outflow junction above a second pressure, the first pressure being smaller than the second pressure.

As a result of this design, the connection between the inflow line is closed below the first pressure and above the second pressure. It is possible for fuel to be led away out of the inflow line into the fuel container between the first pressure and the second pressure, and thus to avoid a rise in the pressure in the inflow line as a result of temperature influences when the internal combustion engine is switched off. This reliably prevents it being possible for fuel to emerge from the injection nozzle when the internal combustion engine is switched off. Closing the connection below the first pressure ensures that the inflow line remains filled with fuel when the internal combustion engine is switched off and it is possible to restart the internal combustion engine without problems. Closing the connection above the second pressure makes normal operation of the internal combustion engine possible at the pressure which is made available in the fuel container by the delivery unit. Throttling the flow in the connection between the first pressure and the second pressure is intended to ensure that the second pressure is also achieved when the delivery unit is operated with a predefined delivery output.

The apparatus according to the invention requires particularly low outlay on assembly if the shutoff valve and the pressure limiting valve are configured as one structural unit.

The apparatus according to the invention can be assembled simply for predefined pressures if the shutoff valve and the pressure limiting valve are arranged one behind the other in the direction of flow of the fuel from the inflow junction to the outflow junction.

The apparatus according to the invention requires only a particularly small number of components if the inflow junction and the outflow junction each have a valve seat and a single valve body which can move between the two valve seats is prestressed against the valve seat of the inflow junction.

According to another advantageous development of the invention, a contribution is made to further simplifying the setting of the predefined pressures if the pressure limiting valve and the shutoff valve each have a spring element and a valve body which is prestressed against a valve seat.

The apparatus makes it possible, for example, to supply a suction jet pump in the fuel container with particularly low structural complexity if the connection between the valve seat of the pressure limiting valve and the valve seat of the shutoff valve has a junction for a further consumer of fuel.

According to another advantageous development of the invention, throttling of the flow between the two predefined pressures requires particularly low structural complexity if the single valve body which can move between the valve seats and a wall which guides the valve body between the valve seats have different cross sections. As a result of this, the valve body is situated in the flow and is pressed against the valve seat of the shutoff valve as the volumetric flow increases.

The reliable removal of fuel when the internal combustion engine is switched off can be ensured, even in the event of severe temperature fluctuations, if the connection between the two valve seats has a duct for flow around the single valve body between the first pressure and the second pressure. This duct is preferably formed by at least one web which guides the valve body. Here, the webs can be grouped in a star shape around the radial circumference of the valve body.

The apparatus according to the invention is designed in a structurally particularly simple way if the valve body has a flat disk, which is made from soft material, and supporting disks arranged on the former.

BRIEF DESCRIPTION OF THE DRAWINGS

The invention permits numerous embodiments. In order to further explain its basic principle, one of these embodiments is shown in the drawing and will be described in the following text. In the drawing.

DETAILED DESCRIPTION OF THE INVENTION

Figure 1:
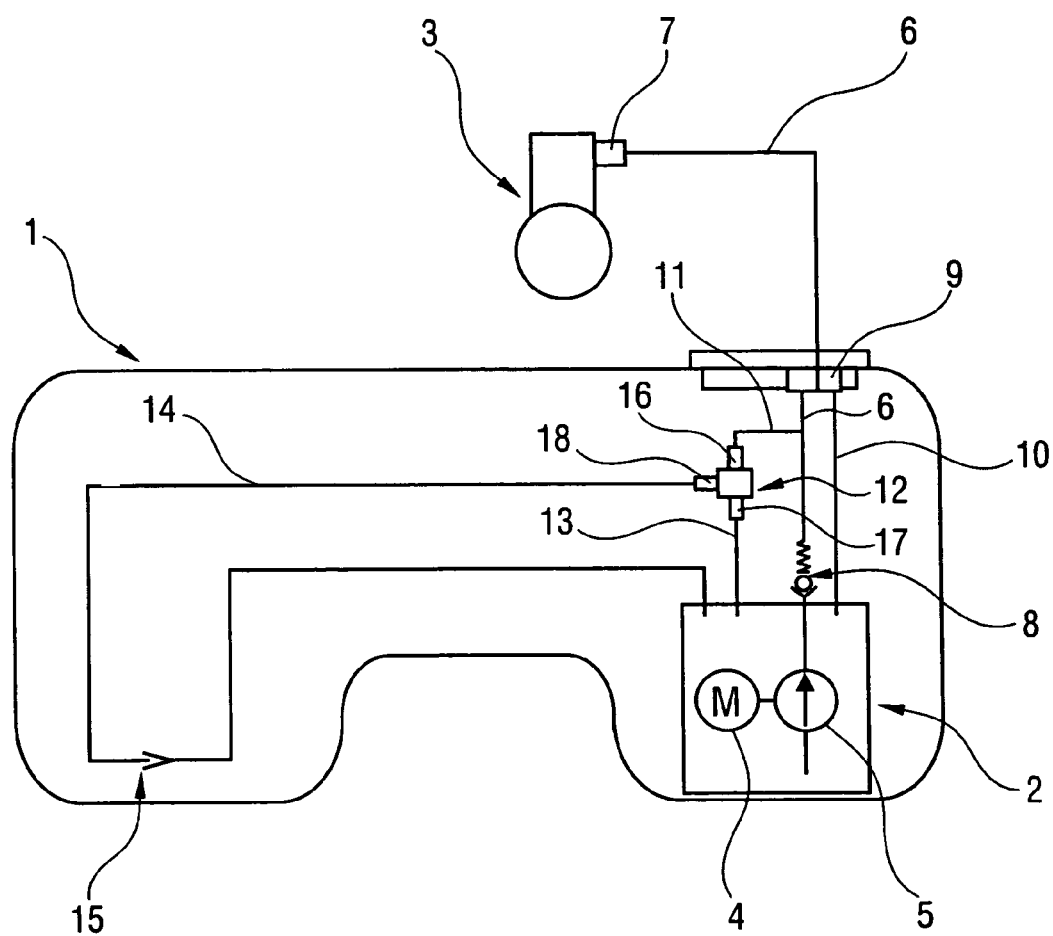
FIG. 1 diagrammatically shows a fuel container with an apparatus according to the invention and an internal combustion engine, FIG. 2 diagrammatically shows a first embodiment of the apparatus according to the invention from FIG. 1, and FIG. 3 diagrammatically shows a second embodiment of the apparatus according to the invention from FIG. 2.

FIG. 1 diagrammatically shows a fuel tank 1 of a motor vehicle with a delivery unit 2 arranged in it for delivering fuel to an internal combustion engine 3. The delivery unit 2 has a fuel pump 5 driven by an electric motor 4 and is connected via an inflow line 6 to an injection rail 7 of the internal combustion engine 3. A nonreturn valve 8 and a pressure limiting valve 9 are arranged in the inflow line 6. The nonreturn valve 8 prevents the inflow line 6 from emptying when the internal combustion engine 3 is switched off, while the pressure limiting valve 9 opens above a predefined pressure and returns excess fuel back to the delivery unit 2 via a return line 10.

Furthermore, the inflow line 6 is connected via a first fuel line 11 to an apparatus 12 for controlling a pressure in the inflow line 6. A second fuel line 13 connects the apparatus 12 to the delivery unit 2. A third fuel line 14 which is connected to the apparatus 12 leads to a suction jet pump 15 which delivers fuel to the delivery unit 2. An inflow junction 16 of the apparatus 12 is connected to the fuel line 11 which leads to the inflow line 6. The apparatus 12 has an outflow junction 17 for connecting to the fuel line 13 which is guided into the delivery unit 2 and a third junction 18 for connecting to the fuel line 14 which leads to the suction jet pump 15.

Figure 2:
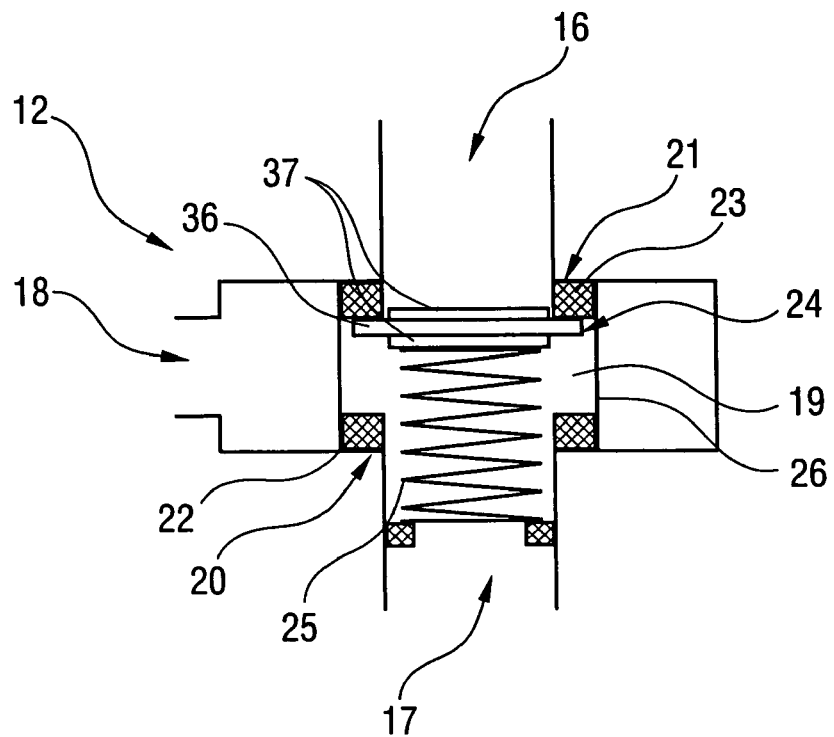

FIG. 2 diagrammatically shows a first embodiment of the apparatus 12 from FIG. 1, in which a shutoff valve 20 and a pressure limiting valve 21 are arranged behind one another in a connection 19 between the inflow junction 16 and the outflow junction 17. The shutoff valve 20 and the pressure limiting valve 21 each have a valve seat 22, 23, the valve seats 22, 23 lying opposite one another and a valve body 24 being movably arranged between the valve seats 22, 23. In the pressureless state shown, the valve body 24 is prestressed by a spring element 25 against the valve seat 23 of the pressure limiting valve 21. The junction 18 of the fuel line 14 from FIG. 1 which leads to the suction jet pump 15 is arranged between the pressure limiting valve 21 and the shutoff valve 20. Furthermore, the apparatus 12 has webs 26 for guiding the valve body 24 which are arranged between the valve seats 22, 23. The valve body 24 has a disk 36 which is made from elastomeric material and two supporting disks 37 which are manufactured from metal.

The inflow line 6 is filled with fuel when the delivery unit 2 shown in FIG. 1 is at a standstill. If the pressure in the inflow line 6 rises as the temperature rises, the valve body 24 is pushed away from the valve seat 23 of the pressure limiting valve 21, and fuel can flow over from the inflow junction 16 to the outflow junction 17. The pressure in the inflow line 6 is therefore limited and fuel is prevented from emerging at the injection rail 7 shown in FIG. 1 when the internal combustion engine 3 is switched off. A high volumetric flow is delivered at high pressure when the delivery unit 2 is operating. The high pressure and the high volumetric flow have the effect that the valve body 24 is pressed against the valve seat 22 of the shutoff valve 20 by the force of the spring element 25 and closes the outflow junction 17. At the same time, fuel can flow via the third junction 18 to the suction jet pump 15 shown in FIG. 1. The pressure in the inflow line 6 is subsequently determined by the pressure limiting valve 9 shown in FIG. 1 and the delivery output of the fuel pump 5.

Figure 3:
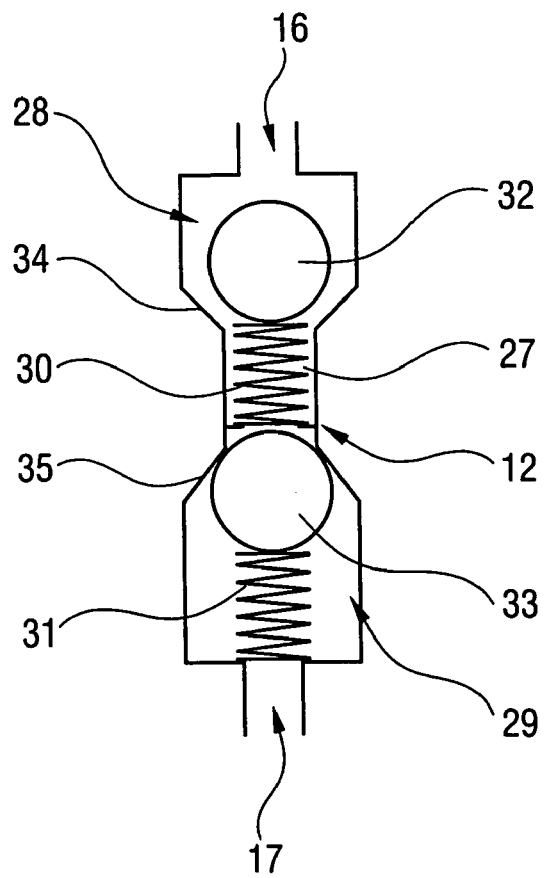

FIG. 3 diagrammatically shows a second embodiment of the apparatus 12 from FIG. 1 in the pressureless state, in which a shutoff valve 28 and a pressure limiting valve 29 are arranged behind one another in a connection 27 between the inflow junction 16 and the outflow junction 17, the shutoff valve 28 being arranged closer to the inflow junction 16 than the pressure limiting valve 29. The shutoff valve 28 and the pressure limiting valve 29 each have a valve body 32, 33, which is prestressed by a spring element 30, 31, and a valve seat 34, 35. In a deviation from the apparatus from FIG. 2, this apparatus 12 has no junction for the fuel line 14 which leads to the suction jet pump 15. However, the flow from the inflow junction 16 to the outflow junction 17 is controlled in the same way as described for the apparatus 12 according to FIG. 2.

The invention claimed is:

1. An apparatus for controlling a pressure in a fuel inflow line of a motor vehicle, having an inflow junction which is provided for connecting to the inflow line and having an outflow junction which is provided for returning fuel into a fuel tank, and having a valve which is arranged in a connection between the inflow junction and the outflow junction, characterized by a pressure limiting valve which closes the connection between the inflow junction and the outflow junction below a predefined first pressure and throttles flow through the connection above the first pressure, and a shutoff valve which closes the connection between the inflow junction and the outflow junction above a second pressure, the first pressure being smaller than the second pressure.

2. The apparatus as claimed in claim 1, characterized in that the shutoff valve and the pressure limiting valve are configured as one structural unit.

3. The apparatus as claimed in claim 1 or 2, characterized in that the shutoff valve and the pressure limiting valve are located serially behind one another in the direction of flow of the fuel from the inflow junction to the outflow junction.

4. The apparatus as defined in claim 1, wherein the inflow junction and the outflow junction each have a valve seat and a single valve body within which the valve bodies are located, which valve body can move between the two valve seats and is prestressed against the valve seat of the inflow junction.

5. The apparatus as defined in claim 1, wherein the pressure limiting valve and the shutoff valve each have a spring element and a valve body which is prestressed toward a valve seat.

6. The apparatus as defined in claim 1, wherein the connection between the valve seat of the pressure limiting valve and the valve seat of the shutoff valve is operably connected to apparatus in the fuel tank.

7. The apparatus as defined in claim 4, wherein the single valve body which can move between the valve seats and a wall which guides the valve body between the valve seats have different cross sections.

8. The apparatus as defined in claim 4 or 7, wherein the connection between the two valve seats has a duct for flow around the single valve body between the first pressure and the second pressure.

9. The apparatus as defined in claim 4, wherein the valve body has a flat disk, which is made from soft material, and supporting disks arranged on the former.

* * * * *